(12) United States Patent
Pollack et al.

(10) Patent No.: US 7,373,986 B2
(45) Date of Patent: May 20, 2008

(54) RISER CONNECTOR

(75) Inventors: Jack Pollack, Houston, TX (US); David C. Riggs, Coppell, TX (US)

(73) Assignee: Single Buoy Moorings, Inc. (CH)

( * ) Notice: Subject to any disclaimer, the term of this patent is extended or adjusted under 35 U.S.C. 154(b) by 292 days.

(21) Appl. No.: 11/243,128

(22) Filed: Oct. 4, 2005

(65) Prior Publication Data

US 2006/0070741 A1 Apr. 6, 2006

Related U.S. Application Data

(60) Provisional application No. 60/616,532, filed on Oct. 6, 2004.

(51) Int. Cl.
*E21B 29/12* (2006.01)

(52) U.S. Cl. .............. 166/359; 166/367; 166/345; 405/224.2

(58) Field of Classification Search ........... 166/359, 166/367, 343, 345; 405/169, 173, 224.2
See application file for complete search history.

(56) References Cited

U.S. PATENT DOCUMENTS

| | | | | |
|---|---|---|---|---|
| 3,248,129 A | * | 4/1966 | Brown ........................ 285/18 |
| 3,729,941 A | * | 5/1973 | Rochelle ..................... 405/169 |
| 4,068,729 A | * | 1/1978 | Peevey .......................... 175/8 |
| 4,076,284 A | * | 2/1978 | Herbert et al. ............... 285/263 |
| 4,174,011 A | * | 11/1979 | Zaremba ........................ 175/7 |
| 4,199,847 A | * | 4/1980 | Owens ......................... 188/67 |
| 4,611,953 A | * | 9/1986 | Owens ......................... 405/224 |
| 4,717,287 A | * | 1/1988 | Laursen ...................... 405/169 |
| 4,907,914 A | * | 3/1990 | Gunderson et al. .......... 405/224 |
| 4,943,188 A | * | 7/1990 | Peppel ...................... 405/223.1 |
| 5,269,629 A | * | 12/1993 | Langner ................... 405/195.1 |
| 5,318,385 A | * | 6/1994 | Goulart et al. ............ 405/195.1 |
| 5,324,141 A | * | 6/1994 | Hunter et al. ............. 405/223.1 |
| 5,480,521 A | * | 1/1996 | Snyder et al. ............... 205/731 |
| 5,702,205 A | * | 12/1997 | Mahone et al. .............. 405/169 |
| 5,947,642 A | * | 9/1999 | Teixeira et al. ............ 405/195.1 |
| 5,951,061 A | * | 9/1999 | Arlt et al. ........................ 285/94 |
| 5,975,210 A | * | 11/1999 | Wilkins et al. ............... 166/341 |
| 6,231,265 B1 | * | 5/2001 | Rytlewski et al. ........ 403/322.1 |
| 6,409,428 B1 | * | 6/2002 | Moog ........................... 405/169 |
| 6,558,084 B2 | * | 5/2003 | Moog et al. .................. 405/224 |
| 6,835,025 B1 | * | 12/2004 | Beard et al. ............... 405/184.4 |

* cited by examiner

*Primary Examiner*—Thomas A Beach
(74) *Attorney, Agent, or Firm*—Leon D. Rosen

(57) ABSTRACT

A riser connector connects the upper portion of a riser (12) having a latching enlargement (32) to a receptacle (14) on a vessel (16), so the riser upper end (22) can connect to a fluid coupling (42) leading to a conduit (40) on the vessel. A double-click mechanism (88), with parts on the enlargement and on the receptacle, turns a load ring on the enlargement to latch the enlargement in place when it is lifted to an upper position and lowered to a latched position, and releases it by again lifting and lowering. A cable coupling (24) is temporarily mounted on the top of the riser to enable the riser to be lifted by a cable (26), the cable coupling being later removed to connect the riser upper end to the fluid coupling on the vessel.

3 Claims, 4 Drawing Sheets

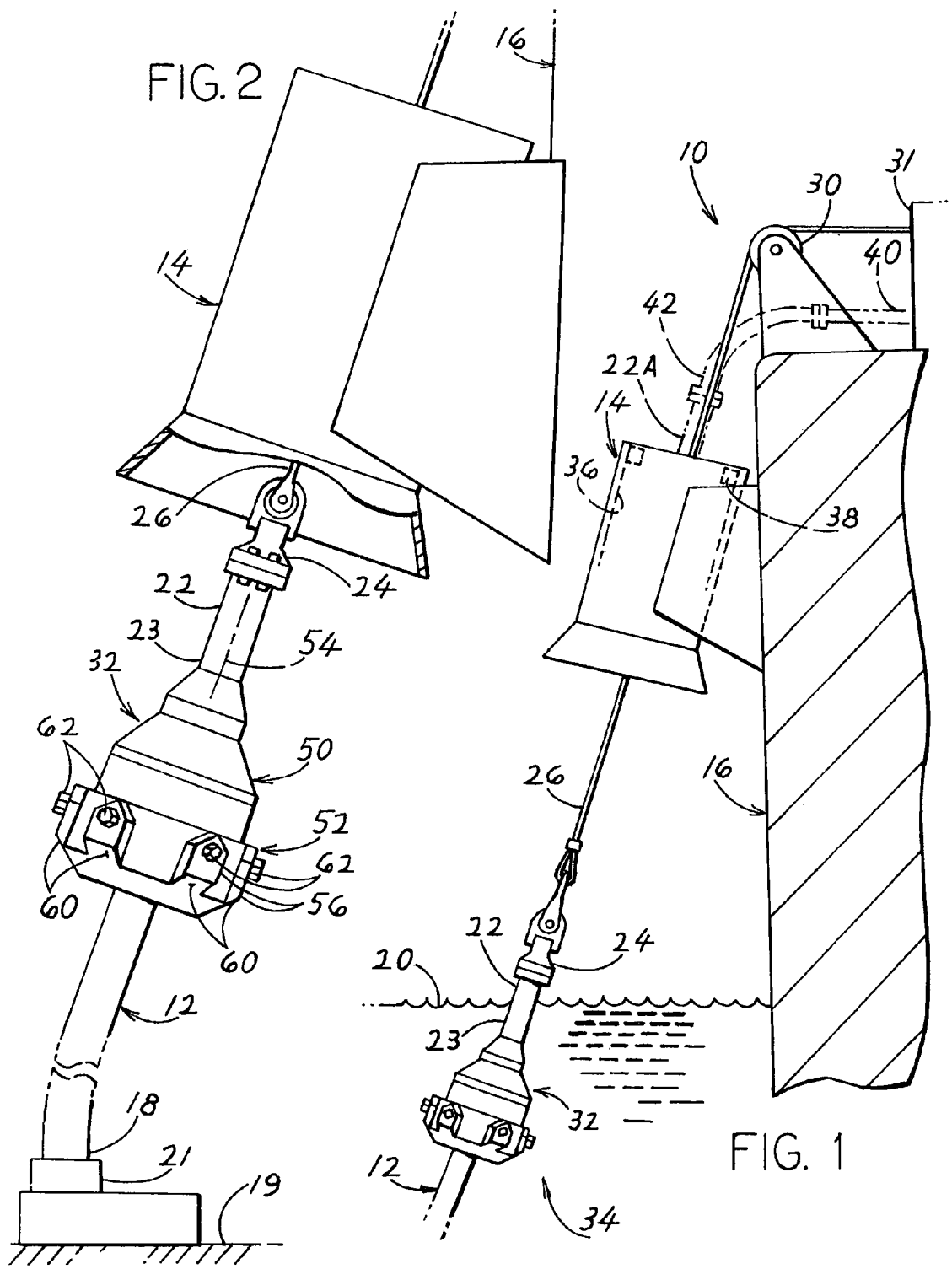

RISER CONNECTOR

CROSS-REFERENCE

Applicant claims priority from U.S. Provisional application Ser. No. 60/616,532 filed Oct. 6, 2004.

BACKGROUND OF THE INVENTION

Risers, which are fluid-carrying conduits, are widely used in the production and transfer of hydrocarbons in offshore installations, such as to carry oil and/or gas from a sea floor well up to a vessel that floats at the sea surface. The connection and disconnection of the ends of risers can be time-consuming. One current method is to mount an enlargement on the riser near an upper end of the riser. The vessel carries a basket that can hold the enlargement. The riser is lifted until the enlargement lies above the level of the basket. The riser is moved sideward through a slot in the basket so the enlargement is directly over the basket. The enlargement is then lowered until it lies nested in the basket. Thereafter, the basket supports the enlargement and the upper end of the riser. This method is time consuming. In some situations, as where the riser upper end must be pulled up into an underwater opening in a turret of the vessel, considerable extra space must be provided, in addition to the awkwardness of shifting the enlargement through the slot before setting it down into the basket. It is desirable that no separate hydraulic or electrical actuator be required to latch the enlargement in the basket. A way of latching a lifted riser enlargement into a receptacle on a vessel, which minimizes the required space around the receptacle, which can be easily operated, and which does not require electric or hydraulic energized locks, would be of value.

SUMMARY OF THE INVENTION

In accordance with one embodiment of the present invention, a riser connector is provided for latching an enlargement on the upper portion of a riser, in a receptacle on a floating structure such as a vessel, which is simple to operate, minimizes the required space around the receptacle and avoids the need for electrically or hydraulically energized locking devices. The riser has an upper portion that extends above the enlargement. A cable coupling is attached to the top of the riser and a pull-in cable is attached to the coupling. The pull-in cable initially extends through the receptacle, and the cable can be pulled until the enlargement enters the receptacle and is then let down about a meter, to automatically latch the enlargement in place.

The automatic latching of the riser enlargement in the receptacle is accomplished by the use of a "double-click" mechanism. Double-click mechanisms are commonly used on ball-point pens, with a first push on a button latching the pen point in a projecting position, and a second push causing the penpoint to retract. U.S. Pat. No. 4,943,188 shows such a double-click mechanism on a tether that extends down from a floating structure to connect to a receptacle on the sea floor, so as to anchor the floating structure. Applicant's receptacle has a through hole, and the cable and then the upper portion of the riser are pulled up through the through hole. When the enlargement is latched in the receptacle, the cable coupling is removed from the riser upper end, and the riser upper end is connected to a fluid coupling on the floating structure. Then, fluid can flow through the riser.

The novel features of the invention are set forth with particularity in the appended claims. The invention will be best understood from the following description when read in conjunction with the accompanying drawings.

jBRIEF DESCRIPTION OF THE DRAWINGS

FIG. 1 is side elevation view showing a riser being pulled up by a cable toward a floating structure, with the upper riser end just above the sea surface.

FIG. 2 is a side view of the riser upper portion as it enters a receptacle on the floating structure.

DESCRIPTION OF THE PREFERRED EMBODIMENTS

Figure 3:
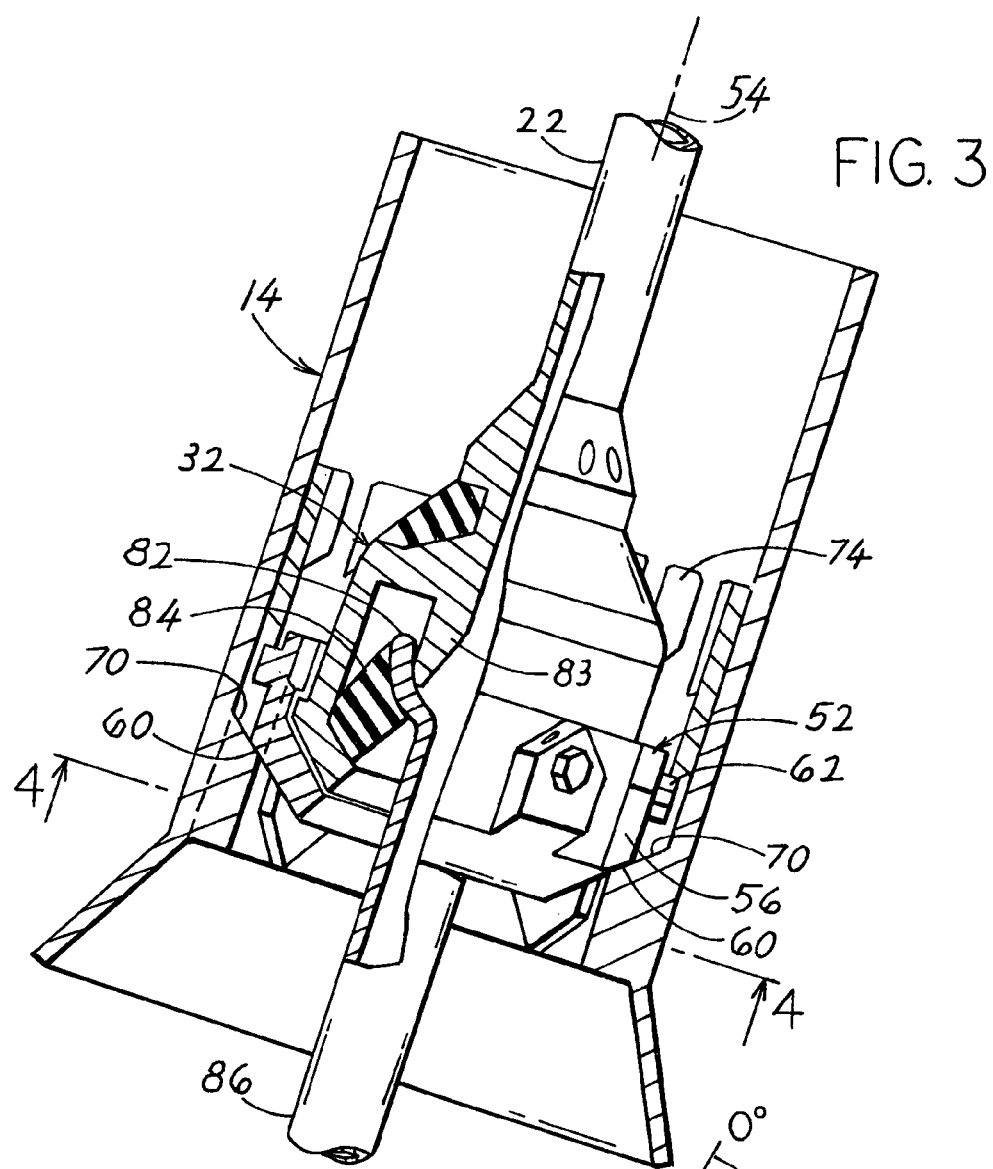
FIG. 3 is a sectional view of the receptacle with the riser enlargement latched therein, and with the portion of the riser enlargement to the left of the enlargement axis being shown in section.

FIG. 1 illustrates a system 10 wherein a riser 12 of about ten inches diameter, is being pulled up into a basket, or receptacle 14. The receptacle is mounted on a fixed offshore tower, or to the side of a floating structure 16 that floats at the sea surface 20, such as a vessel that produces hydrocarbons from an undersea reservoir or that flows hydrocarbons to or from a seafloor pipeline. In one example (FIG. 2), the lower end 18 of the riser has been connected to a fluid coupling 21 leading to a sea floor hydrocarbon well beneath the sea floor 19, and the upper end 22 of the riser must be coupled to the vessel 16 to carry produced hydrocarbons to the vessel for processing (remove stones, sand and water, etc.) for later transfer to a tanker. A cable coupling 24 has been temporarily connected to the upper end of the riser, and a pull-in cable 26 (cable, rope, or other line) has been connected to the coupling. A sheave 30 (FIG. 1) directs the cable to a winch 31 on the vessel that pulls the cable and therefore also pulls up the riser. The cable extends through a through hole or passage 36 of the receptacle 14. When the riser has been pulled in sufficiently for an enlargement, or latching enlargement 32 at the bottom of the riser upper portion 23 to move up into the receptacle 14, the enlargement may engage a bumper or stop 38 in the receptacle and cannot move up further, or the enlargement is moved up to a predetermined height. The cable is then lowered by perhaps a meter, and the enlargement automatically becomes latched in the receptacle. Because the enlargement is latched, the riser that is attached to the enlargement, cannot move down. The receptacle 14 which is fixed to the vessel or other structure, and the enlargement 32 on the riser, can together be referred to as a riser connector 34.

With the riser upper end fixed in the latched position shown in phantom lines at 22A in FIG. 1, a conduit 40 on the vessel is connected to the top of the riser. This can be done by disconnecting the cable coupling 24 and connecting the riser upper end to a fluid or pipe coupling 42 at the adjacent end of the conduit. After the connection to the conduit coupling, hydrocarbons or other fluid or control elements can flow through the riser up to or down from the vessel. At a later time, the riser may have to be disconnected from the vessel, as when a large storm is approaching, for change out, for maintenance purposes, or when the riser is no longer required. Such disconnection can be accomplished by disconnecting the riser upper end (or a fluid connector thereon) from the fluid coupling 42, reconnecting the cable coupling 24, and lowering the cable with the winch after first raising it by about a meter.

FIG. 2 shows that the enlargement 32 includes a body 50 and a load ring 52 that can rotate on the body about a riser axis 54. The load ring 52 has six support lugs 56 with support surfaces 60 that will be supported by a corresponding surface on the receptacle. The support lugs also carry cam followers 62 that will engage cams on the receptacle to rotate the connector load ring.

FIG. 3 shows details of the latching enlargement 32 and of the receptacle 14, with the enlargement in a fully latched position. Only the left side of the figure, to the left of the primarily vertical riser axis 54, shows the enlargement in section. The support surfaces 60 of the lugs that are part of the connector load ring 52, bear against a receptacle supporting surface 70. The supporting surface 70 lies at the top of a receptacle guiding portion 72. The figure also shows cams 74 which engage the cam followers 62 on the lugs.

Figure 4:
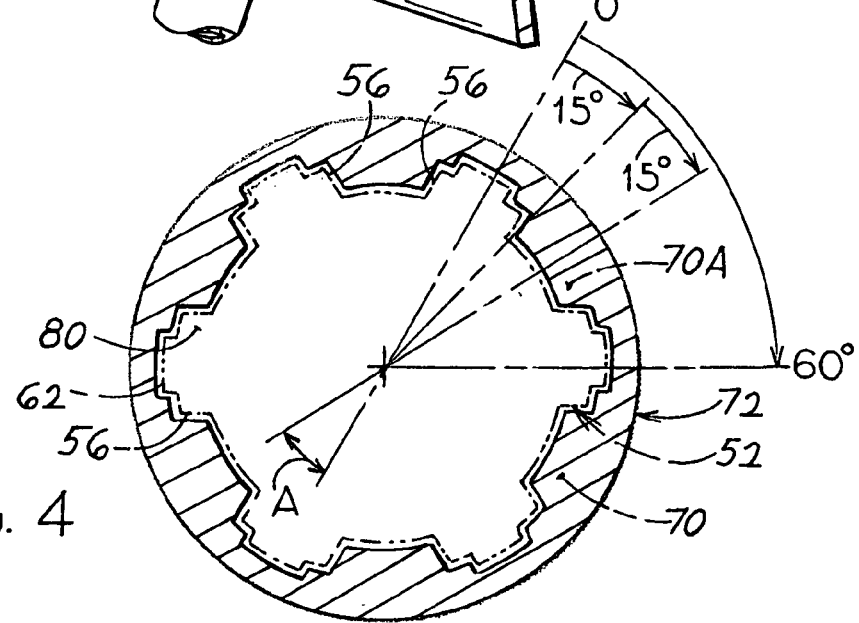
FIG. 4 is a sectional view taken on line 4-4 of FIG. 3.

FIG. 4 shows that the receptacle guide portion 72 has six slots 80 that receive the six lugs 56 on the load ring 52. The slots have portions that receive the cam followers 62 to guide the six lugs into the six slots as the enlargement is raised in the receptacle. As mentioned above, the cam followers lie on the connector load ring 52 which can rotate on the enlargement body.

Figure 5:
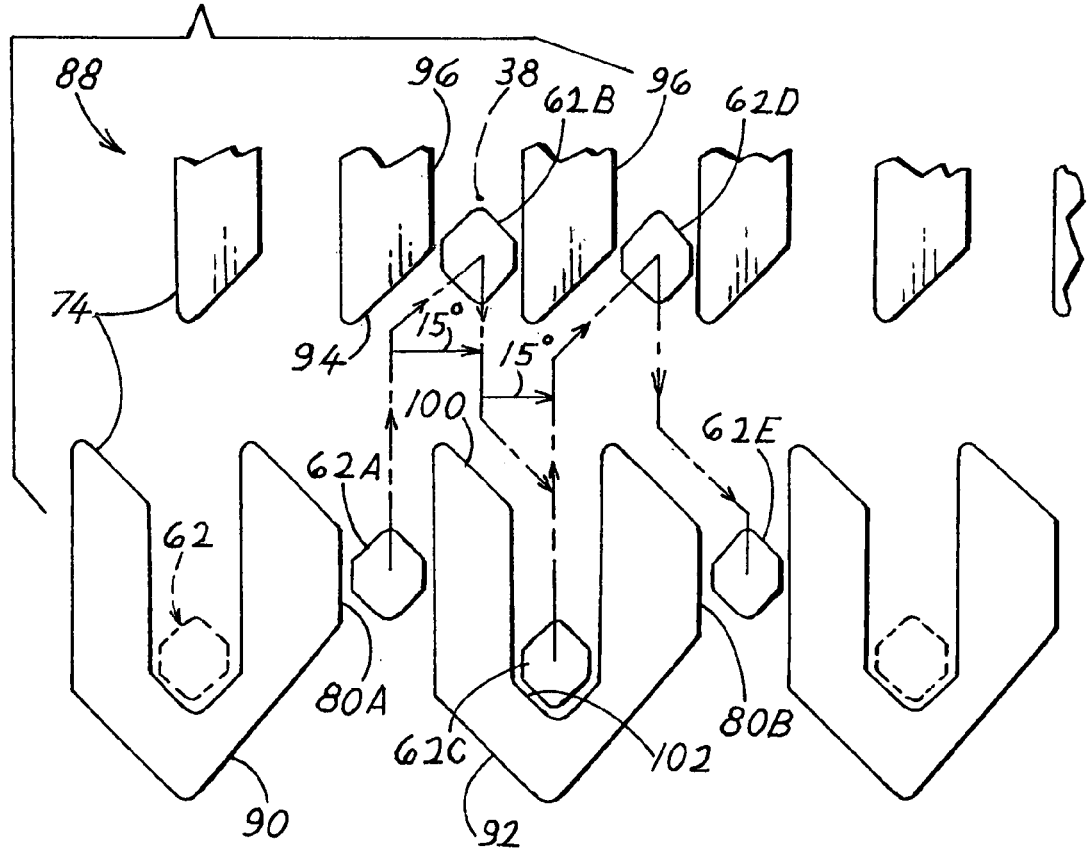
FIG. 5 is a view showing different portions of enlargement cam followers as they move along receptacle cams.

The cams on the receptacle and the cam followers on the enlargement form a "double-click" mechanism, that rotates the cam followers in steps as the enlargement on the riser moves up and down, and that alternately cause support and release of the enlargement. Such double click mechanism is widely used in ball-point pens with retracting tips. FIG. 5 shows about 180° of the double click mechanism 88, laid flat on the paper of the figure. The particular double click mechanism is one of the types shown in U.S. Pat. No. 4,943,188 for an anchor tether.

FIG. 5 shows a cam follower 62 of the double click mechanism 88 as it moves through various positions with respect to the cam surfaces of cams 74 of the mechanism. The cams and cam followers form parts of the double click mechanism. The cam follower at 62A moves up as the riser is pulled up into the receptacle. Cam surfaces 90, 92 guide the cam follower into a slot 80A. Near the top of its path the cam follower encounters a cam surface 94 that rotates the cam follower by 15° as it continues to move up until it reaches position 62B. Instead of placing a stop at 38, applicant provides vertical slots 96 that allow continued upward movement. Applicant stops upward movement by the bumper 38 (FIG. 1) or, preferably, by an operator stopping the winch when he sees the top of the riser at a certain level. The riser is then lowered and the cam follower encounters cam surface 100 that rotates the cam follower by another 15o to position 62C. Rotation of the cam follower 62 on the enlargement 32 at the upper portion of the riser, involves twisting of the cable 26 that supports the riser. At 62C the cam follower lies in a retained position wherein it is locked in rotational position and the lugs 56 (FIG. 3) are supported by a support surface 70, and the riser is held in this position indefinitely while fluid flows through the riser. The cam follower 62C lies above a bottom surface 102.

FIG. 5 shows that to later disconnect the riser, the cam follower is lifted from position 62C to position 62D while it and the load ring turn another 15°. Then the cam follower is lowered, and it moves down along slot 80B to position 62E where the cam follower is in a release position and the riser can be lowered out of the receptacle. The enlargement has six cams that engage six sets of the cam followers. The vertical movement of the cam followers is on the order of magnitude of a meter, and is usually about a meter. Compared to the riser entire length which is usually a plurality of 10's of meters, such vertical movement of about a meter to latch and unlatch can be referred to as a "slight" movement.

Referring again to FIG. 3, the riser includes a cupped end 82 that is clamped between a body abutment 83 and an elastomeric bearing ring 84. This allows the riser portion 86 to deflect by as much as perhaps 20° with respect to the riser upper portion 23. This is a known arrangement.

Figure 6:
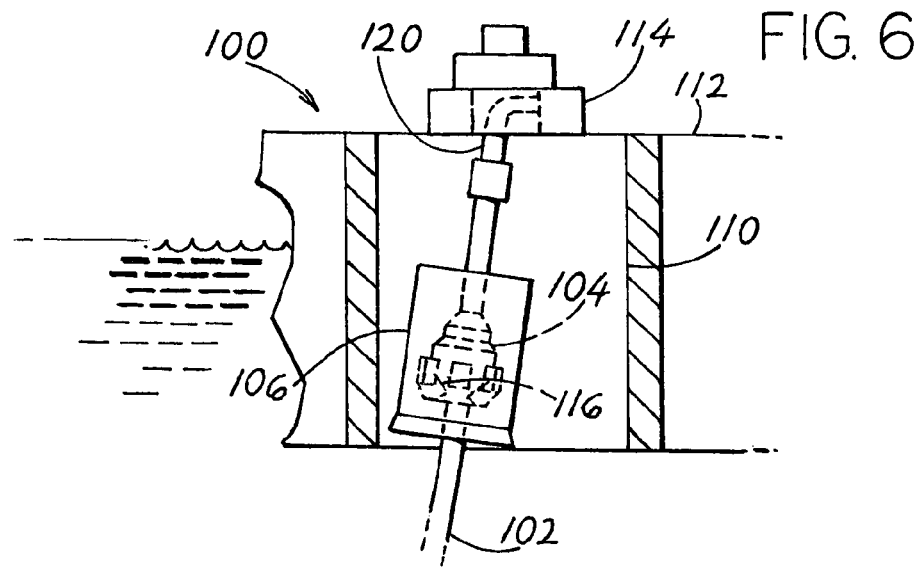
FIG. 6 is a simplified sectional view of a vessel turret on which a receptacle is mounted.

FIG. 6 shows another system 100 wherein a riser 102 carries an enlargement 104 that must be pulled up into a receptacle 106. The receptacle lies in a turret 110 that lies in a vessel 112. The top of the riser is shown connected through a pipe 120 to a fluid swivel 114 on the turret. It can be seen that there is a considerable advantage in being able to pull a cable, followed by the riser and enlargement, directly into a receptacle passage 116 and latch the enlargement in the receptacle. If the enlargement had to be pulled up beside the receptacle and then moved over the receptacle and lowered, then a lot more room would be required. It also should be noted that the latching arrangement can be used to lower a riser lower end onto a connector on a platform on the sea floor. This is done by orienting the receptacle and riser enlargement upside-down and using the reverse vertical movements of the enlargement to latch it to the receptacle so the riser cannot move upward.

Although applicant shows the cam followers and support lugs on a rotatable load ring, it would be possible to instead use a rotatable load ring on the receptacle that holds its cams, or to mount the entire receptacle or entire enlargement so it can rotate.

Figure 7:
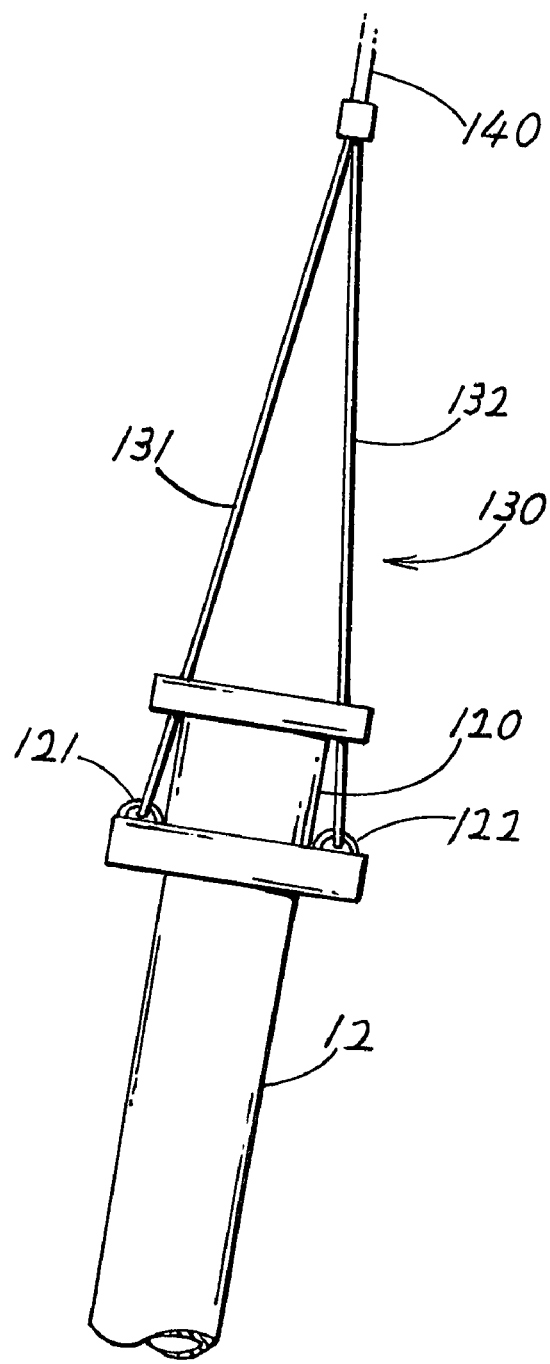
FIG. 7 is a side elevation view of a portion of a riser with a coupling of another embodiment of the invention.

FIG. 7 shows a riser with a coupling 120 at its upper end that can be connected to a corresponding coupling on a floating structure conduit. The coupling 120 includes a plurality of eyelets 121, 122 (and possibly a third one). An intermediate cable connector 130 formed by a plurality of cables 131, 132 extend to a single cable 140 that is pulled up by a winch.

Thus, the invention provides a latching arrangement for latching a conduit used in offshore hydrocarbon transfers, such as a riser, to a structure such as one at the sea surface or sea floor. The latching arrangement enables the conduit to be pulled through a receptacle and then latched in place, by vertical movement of the riser and without requiring an energized actuator such as one energized by hydraulic fluid or electricity. A cable coupling is connected to a riser end and extends through a receptacle of the latching arrangement, to pull a cable and the riser until an enlargement on the riser enters the receptacle and small (on the order of a meter) vertical movement of the riser latches the enlargement in the receptacle. In some cases, an end of the riser that projects beyond the enlargement is disconnected from the cable coupling and connected to a pipe.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for connecting an enlargement on an upper portion of a riser that lies below the riser upper end wherein the riser is intended to extend up toward a receptacle on a floating structure that floats at the sea surface, so the upper end of the riser can be connected to a conduit on the floating structure, comprising:

establishing the two devices of a double click mechanism, one on said enlargement and the other on said receptacle;

extending a cable from a winch on the floating structure, through a hole in said receptacle, to the upper end of said riser, and connecting the cable to the upper end of the riser;

pulling up the cable to lift the riser upper portion with the enlargement thereon until the enlargement enters the receptacle and moves upward therein while a first of said double click mechanism devices turns, and then allowing the cable and enlargement to fall while said first device turns further, all while said cable twists, until said first device is prevented from turning and said enlargement is stopped from further falling while still in the receptacle, all without operating any hydraulic or other energized actuator;

connecting the upper end of the riser to said conduit.

2. The method described in claim 1 wherein:

said step of connecting a cable to the upper portion of the riser includes mounting a cable coupling to the upper end of the riser and connecting the cable to the cable coupling:

said step of connecting the upper end of the riser to said conduit comprises first removing the cable coupling.

3. The method described in claim 1 including:

disconnecting the upper end of the riser from said structure conduit;

operating said winch while said cable is connected to said riser upper portion, to raise said enlargement within the receptacle while said first device turns still further, and then operating said winch to lower said enlargement below said receptacle.

* * * * *